(12) United States Patent
Kanno et al.

(10) Patent No.: US 6,426,804 B1
(45) Date of Patent: *Jul. 30, 2002

(54) IMAGE FORMING APPARATUS

(75) Inventors: Tooru Kanno, Kawasaki; Osamu Inage, Yokohama, both of (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,776

(22) Filed: Apr. 23, 1998

(30) Foreign Application Priority Data

Apr. 23, 1997 (JP) .............................. 9-120234

(51) Int. Cl.[7] .............................................. H04N 1/40
(52) U.S. Cl. ...................................... 358/445; 358/1.1
(58) Field of Search ................................ 358/445, 474, 358/335, 320, 337, 148, 483, 319, 451; 386/84; 348/220, 362

(56) References Cited

U.S. PATENT DOCUMENTS

| | | | | |
|---|---|---|---|---|
| 4,532,541 A | * | 7/1985 | Cooper | 358/21 |
| 5,191,434 A | * | 3/1993 | Kim | 358/335 |
| 5,461,487 A | * | 10/1995 | Askura | 358/339 |
| 5,655,048 A | * | 8/1997 | Ueda | 386/84 |
| 5,706,387 A | * | 1/1998 | Makisshima | 385/120 |
| 5,929,899 A | * | 7/1999 | Takahashi | 348/65 |
| 6,104,864 A | * | 8/2000 | Kondo et al. | 386/117 |
| 6,256,063 B1 | * | 7/2001 | Saito | 348/231 |

* cited by examiner

*Primary Examiner*—Jerome Grant, II
*Assistant Examiner*—Negussie Worku
(74) *Attorney, Agent, or Firm*—Oblon, Spivak, McClelland, Maier & Neustadt, P.C.

(57) ABSTRACT

An image forming apparatus and a method of forming an image. A timing generating circuit is constructed without employing an exclusively used IC. A CCD can be easily replaced without performing any new designing. A timing signal is suitably delayed corresponding to a delay time between an input image signal and an output image signal per each of respective processing circuits sequentially connected. The apparatus enables high-speed image processing. The apparatus includes an optoelectric conversion element, a signal processing section, and a timing generating section. The timing generating section includes a first pattern signal generating section which generates a previously established pattern signal, a second pattern signal generating section which repeatedly generates the previously established pattern signal and stops the generation of the pattern signal only during a specified time period of one scanning, and a third pattern signal generating section for putting the previously established pattern signal in an active state only during the specified time period from the generation of a trigger signal in one main scanning.

13 Claims, 16 Drawing Sheets

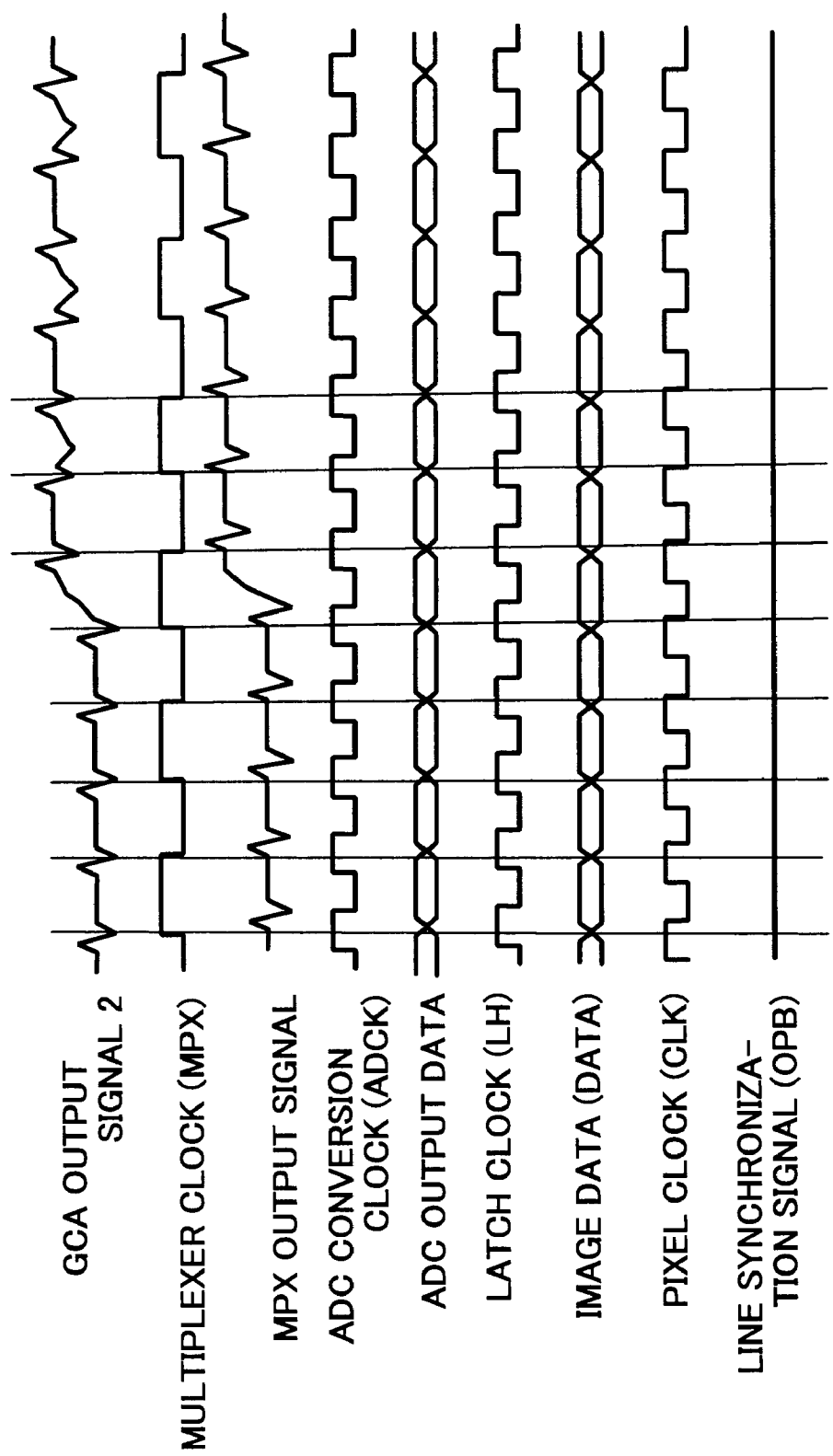

IMAGE FORMING APPARATUS

BACKGROUND OF THE INVENTION

1. Field of the Invention

The present invention relates to an image forming apparatus such as an electrophotographic copying machine, laser printer, facsimile device, etc., and in particular relates to a timing processing technology for an optoelectric conversion element, such as a CCD, etc., and a processing section for processing an image signal read out by the optoelectric conversion element.

2. Description of the Background Art

Many recent image forming apparatuses are constructed to convert reflection light reflected from a manuscript document to an electric signal as image data by using an optoelectric conversion element such as a CCD, etc., and to perform various necessary processings after digitizing the obtained image data in a signal processing section.

At this time, although various timing signals are needed in the CCD and the signal processing section, these signals are generated and supplied by an external timing circuit. In such background art, a drive signal for driving the CCD and a timing signal supplied to a signal processing section are created by a timing generating circuit constructed with parts of random logic, a delay line, an exclusively used IC, etc. per each of respective CCDs. As a result, a timing time and delay time have been fixed.

The above matter is concretely described hereinafter.

FIG. 12 is a block diagram of a reading-out section of an electrophotographic copying machine (hereinafter referred to as a "copying machine") shown as an example of a background image forming apparatus. Since the overall operation and function thereof are already well known, the functional portion related to the subject matter to be solved in the present invention is described, referring to FIGS. 13 and 14 showing timing waveforms of a main part of a reading out section.

A timing generating section 103 as shown in this example is constructed with a timing generator 103a, an exclusively used IC 103b, and a random logic and delay line 103c. The timing generating section 103 supplies a timing signal to CCD 1 in a main part of a reading out system and a signal processing section 2, etc. The signal processing section 2 has functions of processing an image data signal and converting the image data signal to digital data.

Two types of phase-shifted shift clock gate signals ($\phi 11$, $\phi 12$, $\phi 21$, $\phi 22$) are supplied to adjacent cells of the CCD 1 from the timing generating section 103. The output from the CCD is coordinated by two systems of buffer circuits 2a-1 and 2a-2. An offset clamp (CLMP) gate signal is applied to analog multiplexers 2b-1 and 2b-2 from the timing generating section 103, and thereby the CCD 1 transmits only a cell signal intended at respective timings to subsequent stage(s).

The signal from the CCD 1 is further coordinated by buffer circuits 2c-1, 2c-2, and the signals thus coordinated are transmitted to sample and hold (S & H) circuits 2d-1 and 2d-2 to which sample clock signals (SHCK1 and SHCK2) are supplied from the timing generating section 103. Next, the signal from the CCD 1 is further transmitted to automatic gain control (GCA) circuits 2e-1 and 2e-2.

Furthermore, a multiplex (MPX) gate signal is applied to a multiplex (MPX) circuit 2f, and thereby the two types of signals are unified into one signal, and the signal thus unified is applied to an AD conversion circuit (A/D converter) 2g.

In the AD conversion circuit 2g, the signal is converted from an analog signal to a digital signal on the basis of an AD converter gate signal (ADCK) applied to the AD conversion circuit 2g. Thereafter, digital image data corresponding to the image on the manuscript document is output by a latch (LATCH) circuit 2h, to which a latch clock (LH) gate signal is applied.

However, as mentioned heretofore, regarding the driving signal for use in the CCD 1 or the timing signal for the respective processing blocks in the signal processing section 2, the timing generator 103 generates the various timing signals such as SHCK1, SHCK2, MPX, ADCK, LH, etc. as shown in FIGS. 12–14. That is, since such various timing signals have been generated by the background apparatus employing random logic, a delay line, or other parts such as an exclusively used IC per each of respective CCDs, the timing time and the delay time are set and fixed so as to fit those times to the CCD 1.

For this reason, in a case that the CCD 1 has to be replaced, it has been necessary to replace also the exclusively used IC 103b for generating the timing signals corresponding to the replaced CCD. Furthermore, since the timing of the image data processings varies very often due to replacing the CCD 1 and the exclusively used IC 103b, it has been necessary to change also the timing time and the delay time of the timing signals supplied to the signal processing section 103 on such an occasion.

As a result, even though a CCD has been rendered comparatively low-cost in recent years and can be procured easily, designing of circumferential apparatuses has to be practiced once again as the CCD 1 and the exclusively used IC 103b have to be replaced together, and thereby costs increase.

Furthermore, since the delay of the image data processing between the respective signal processing blocks is largely influenced by a value of voltages applied to the respective circuit blocks and ambient temperature, if image data are processed with high speed by use of timing signals supplied from an external timing generating circuit, a very small shift of the timing can cause very serious problems. Thereby, when image processing has to be performed with high quality, the accuracy of timings required to the timing generating section 103 turn out to be very strict and quick action for coping with problems may become very difficult. Even though such quick action can be realized, such an apparatus which can realize such quick action then turns out to be very expensive.

SUMMARY OF THE INVENTION

The present invention has been made in consideration of the above-mentioned problems in order to improve such various subject matter.

It is accordingly one object of the present invention to solve and improve the above-mentioned drawbacks in the background art.

It is another object of the present invention to provide a novel image forming apparatus capable of solving and improving the above-mentioned drawbacks in the background art.

It is still another object of the present invention to provide a novel image forming apparatus capable of making unnecessary any new designing at a time of replacing a CCD, etc., by constructing a timing generating unit without employing any exclusively used IC.

It is still another object of the present invention to provide a novel image forming apparatus capable of easily replacing a CCD without resulting in any unnecessary cost increases.

It is still another object of the present invention to provide a novel image forming apparatus capable of accomplishing image data processing with low-cost and at high speed by delaying a timing signal corresponding to a delay time between an input image signal and an output image signal per each of respective processing circuits, and for processing image data in such a state.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 14 is a timing chart for illustrating an operation of a reading-out section in the background image forming apparatus of FIG. 12.

DESCRIPTION OF THE PREFERRED EMBODIMENTS

Figure 1:
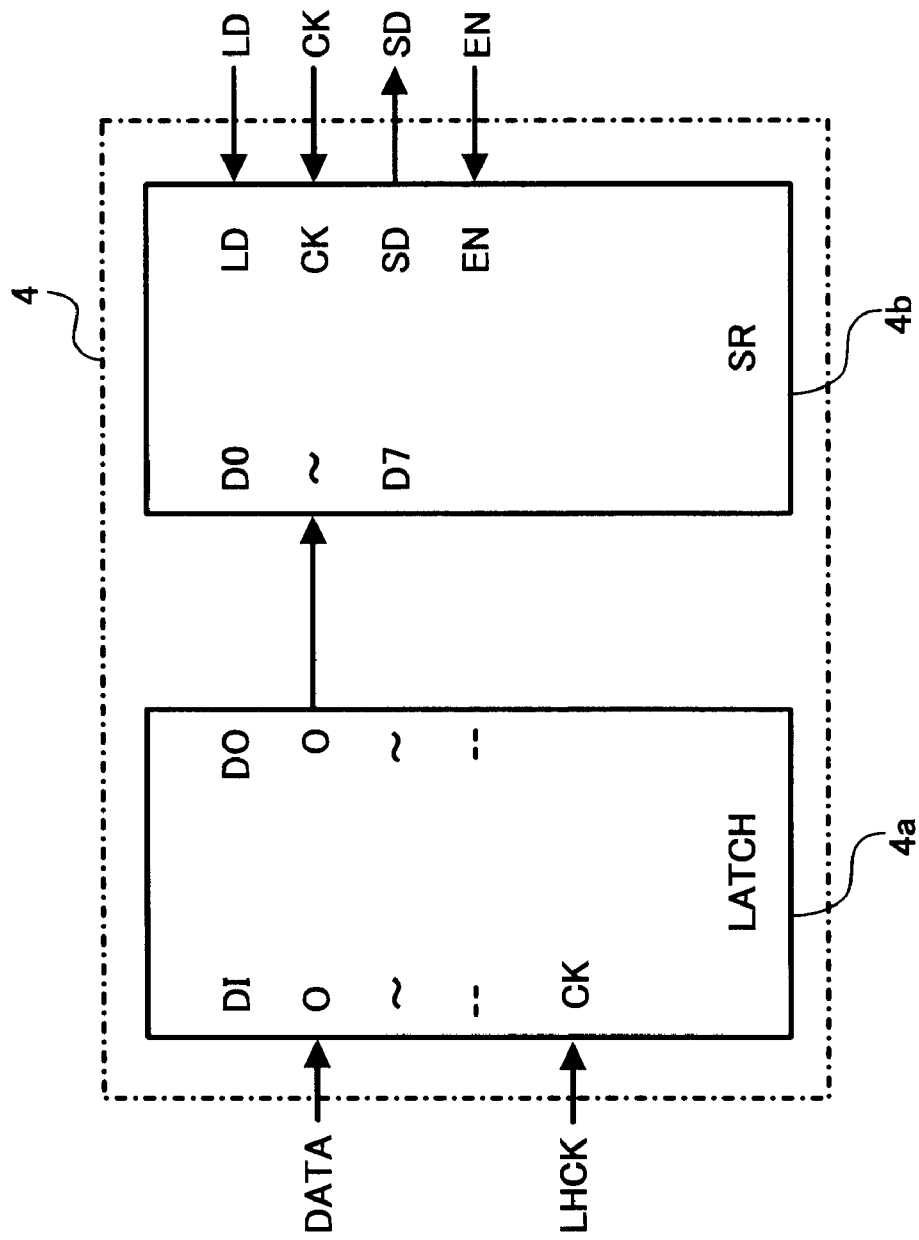
FIG. 1 is a circuit block diagram illustrating an embodiment of a first generating section according to the present invention.

Hereinafter, preferred embodiments of the present invention are described generally with reference to the Figures, wherein like reference numerals designate identical or corresponding parts throughout the views. The embodiments of the present invention are concretely described in detail, hereinafter, referring to FIG. 1 through FIG. 11.

Figure 7:
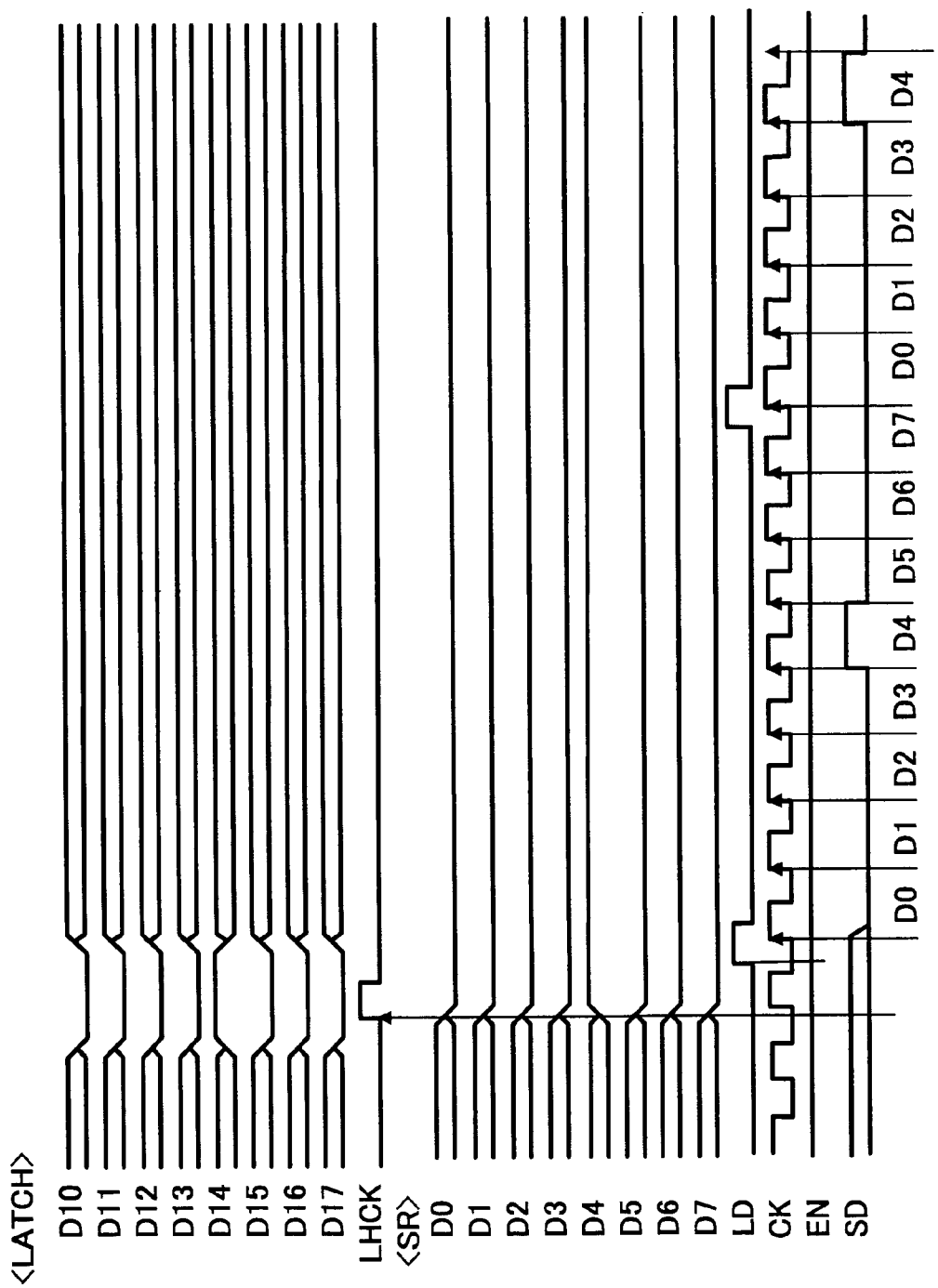
FIG. 7 is a timing chart illustrating an operation in the first generating section of an embodiment according to the present invention.

FIG. 1 is a circuit block diagram illustrating an example of a first generating section 4 employed in the present invention. The first generating section 4 generates a previously set pattern repeatedly. FIG. 7 is a timing chart illustrating an example of a timing signal generated by the circuit in the first generating section 4.

The first generating section 4 is provided with a latch (LATCH) 4a and a shift register (SR) 4b. The latch 4a holds previously set data input to the data (DATA) signal input terminals D10–D17 at a rising up (leading) edge of the clock signal CK and outputs the held data to the output terminals DO0–DO7. The shift register (SR) 4b loads the parallel data input to the terminals D0–D7 at the leading edge of load signal (LD) and shifts the loaded data at each leading edge of the shift clock (CK) signal and outputs the data as serial data (SD).

When an enable (EN) signal is put in a state of logical "H", the shift clock (CK) becomes effective. When the same enable signal (EN) is put in a state of logical "L", the enable signal (EN) maintains the immediately preceding state without being shifted. Namely, by making the enable (EN) signal always active, the pattern set to the terminals D10–D17 is converted to a serial signal by the shift clock (CK) signal and is repeatedly output per each period of the load signal (LD).

Figure 2:
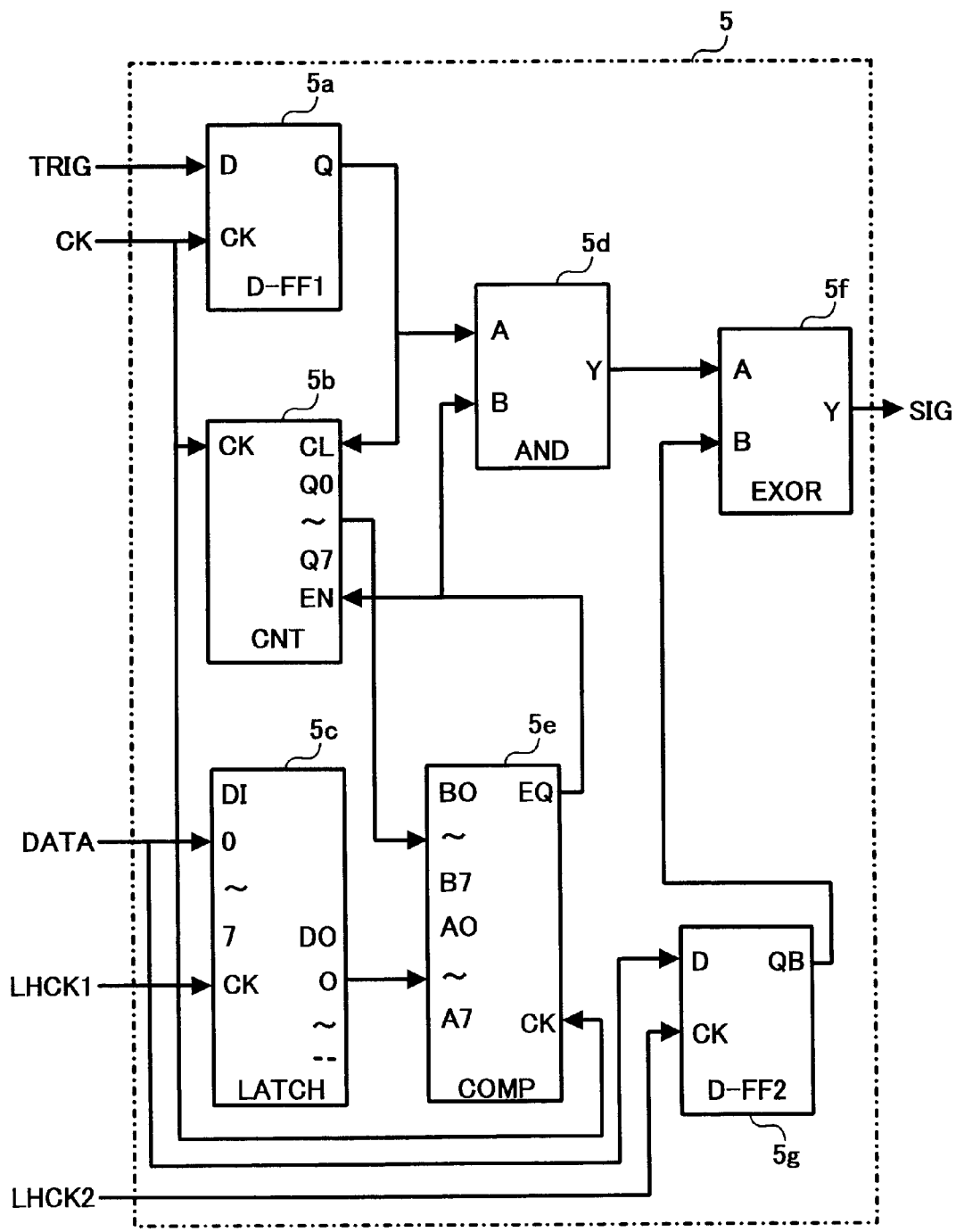
FIG. 2 is a circuit block diagram illustrating an embodiment of a second generating section according to the present invention.
Figure 8:
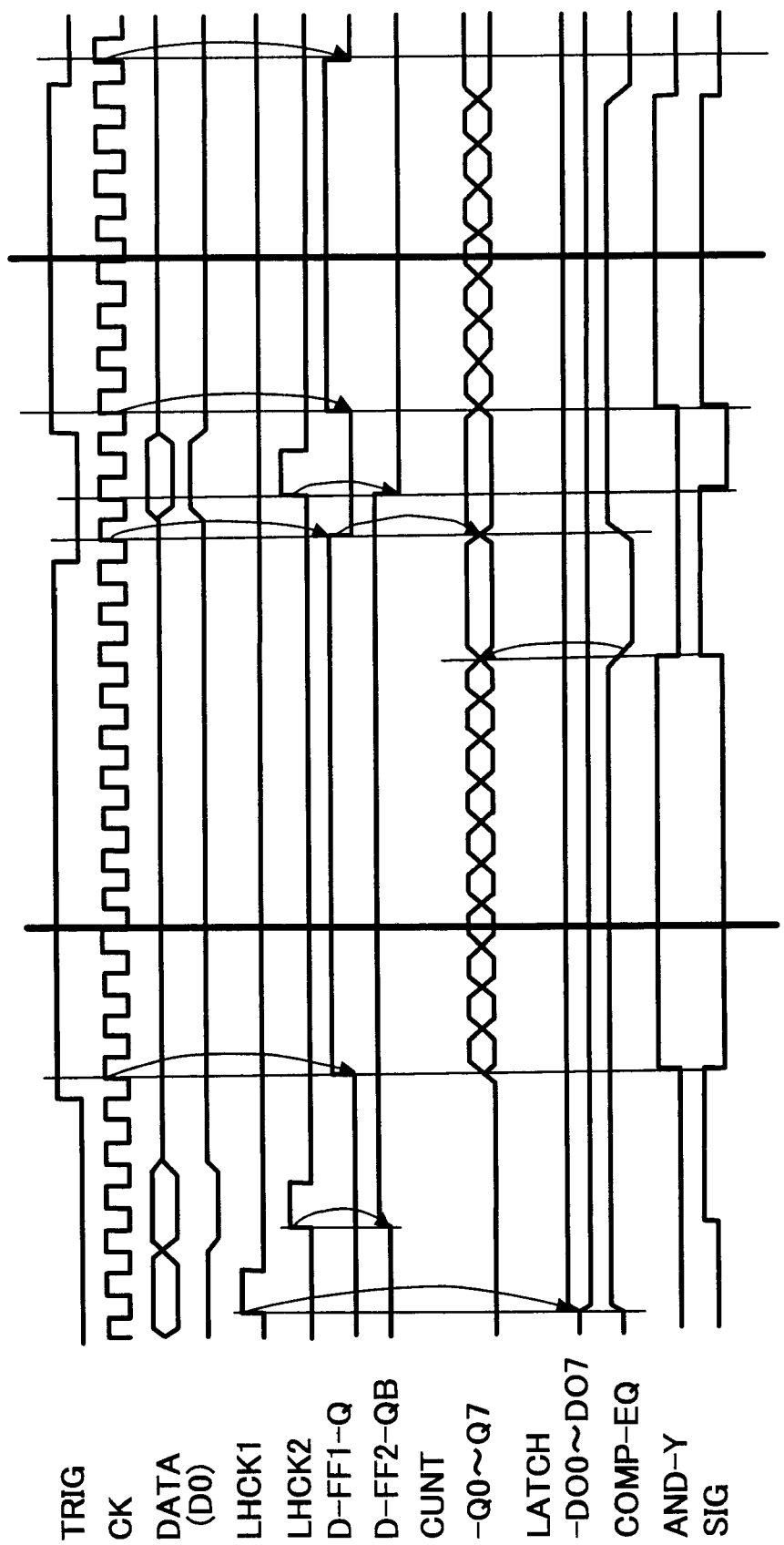
FIG. 8 is a timing chart illustrating an operation in the second generating section of an embodiment according to the present invention.

FIG. 2 illustrates an example of a circuit of a second generating section 5. The circuit functions so as to repeatedly generate a previously set pattern and stop the generation of the pattern only during a specified time period previously set for one scanning. FIG. 8 is a timing chart illustrating an operation in the second generating section 5. In FIG. 2, a trigger signal TRIG is externally input to the D input terminal of a D-type flip flop (D-FF1) 5a and a standard clock for prescribing the setting period is supplied to the clock input terminal (CK). The standard clock is also input to a counter (CNT) 5b and a comparator (COMP) 5e as well as the D-type flip flop (D-FF1) 5a. The D input signal is latched at a leading edge of the clock (CK) and is output from the output terminal Q of the D-type flip flop 5a with a timing in synchronism with the clock (CK).

The output signal Q of the D-type flip flop 5a is input to a clear (CL) input terminal of the counter 5b and is also supplied to the input terminal A of an AND gate (AND) 5d. The count value of the counter 5b becomes "00H" during the time period when the Q output is in the state of logical "L". During the time period when the clear (CL) input terminal of the counter 5b is put in the state of logical "H" and the count enable signal EN (that is, the EQ output of the comparator 5e) is also put in the state of logical "H", the standard clock input to the clock (CK) input terminal is counted by the counter 5b. The output terminals Q0–Q7 for outputting the count values of the counter 5b are connected to a group of input terminals B0–B7 of comparator 5e. The previously set data are input to the terminals D10–D17 of the latch (LATCH) 5c and are kept at the leading edge of the latch clock (LHCK1). Thereafter, the data is output from the output terminals DO0–DO7. The setting data is supplied to another group of input terminals A0–A7 of the comparator 5e. The counting value of the counter 5b and the setting value are compared with each other at each respective leading edge of the standard clock supplied to the clock input terminal CK in the comparator 5e. When the counting value and the setting value coincide with each other, a coincidence output signal EQ is at a logical "L".

The output EQ of the comparator 5e is supplied to the EN terminal of the counter 5b. When the output EQ is at a logical "L", the counter 5b stops counting and maintains the state until the CL signal of the counter 5b becomes logical "L". When the CL signal becomes logical "L", the count value becomes "00H" and the EQ output of the comparator 5e becomes logical "H" at the leading edge of the next standard clock.

The EQ output terminal is connected also to another input terminal B of the AND gate 5d. When the Q output of the D-type flip flop 5a is put in the state of logical "H", the counter 5b starts counting. During the time period from the start of the counting until the changing of the EQ output from logical "H" to logical "L" at the leading edge of the next standard clock after the counting value arrives at the setting value, the output of the AND gate 5d is maintained at the state of logical "H".

By performing the above-mentioned operations, it is possible to generate a signal that is put in the active state during the time period set from the position of the externally input trigger signal. Furthermore, the D-type flip flop (D-FF2) 5g outputs an inverse value of the setting value showing the active polarity which is input to the D terminal of the flip flop 5g and maintained by the standard clock CK from the output terminal QB of the flip flop 5g. The output of the AND gate 5d and the output of the D-type flip flop 5g are exchanged by operation of the exclusive OR gate (EXOR) 5f.

Figure 3:
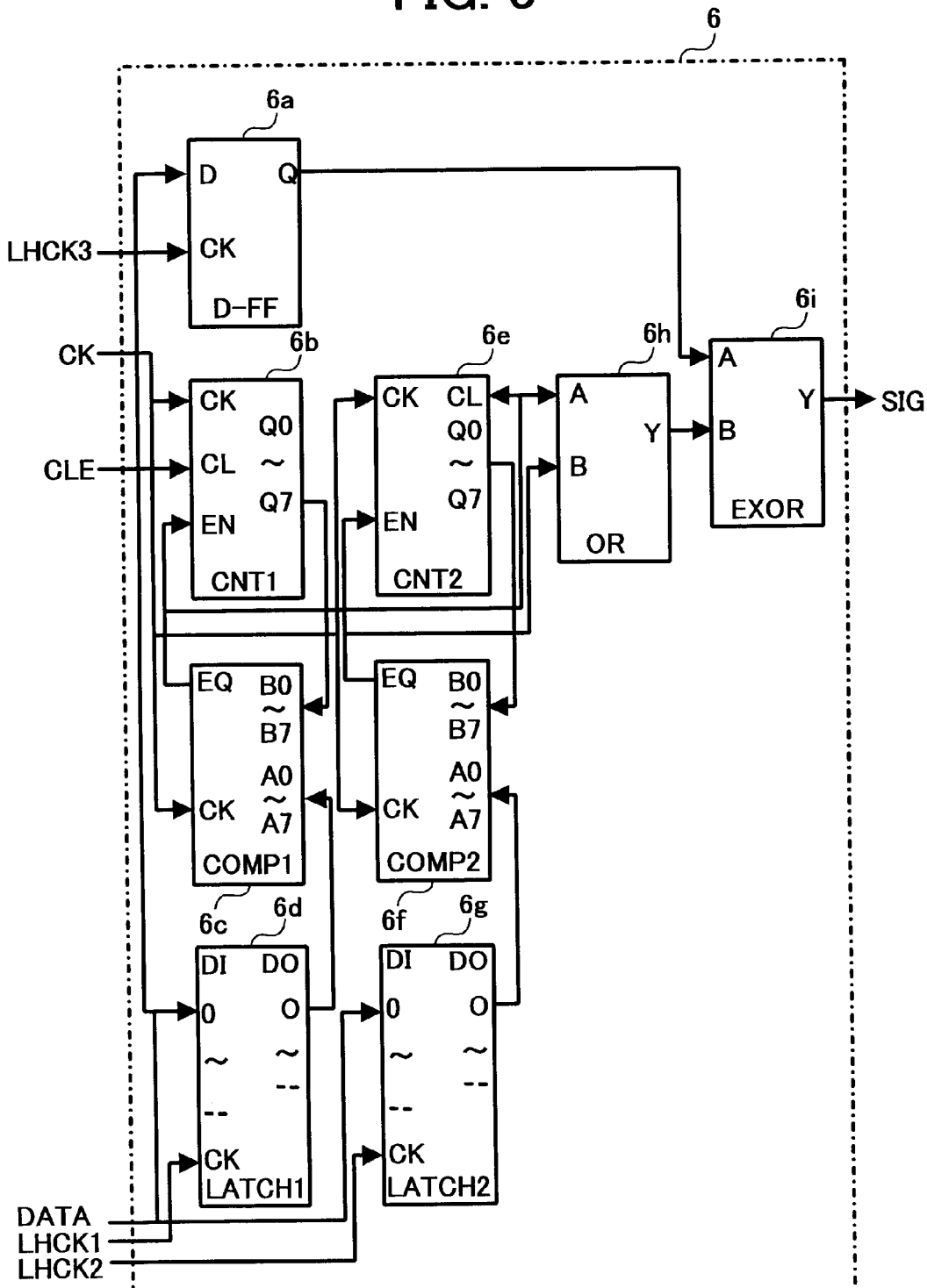
FIG. 3 is a circuit block diagram illustrating an embodiment of a third generating section according to the present invention.
Figure 9:
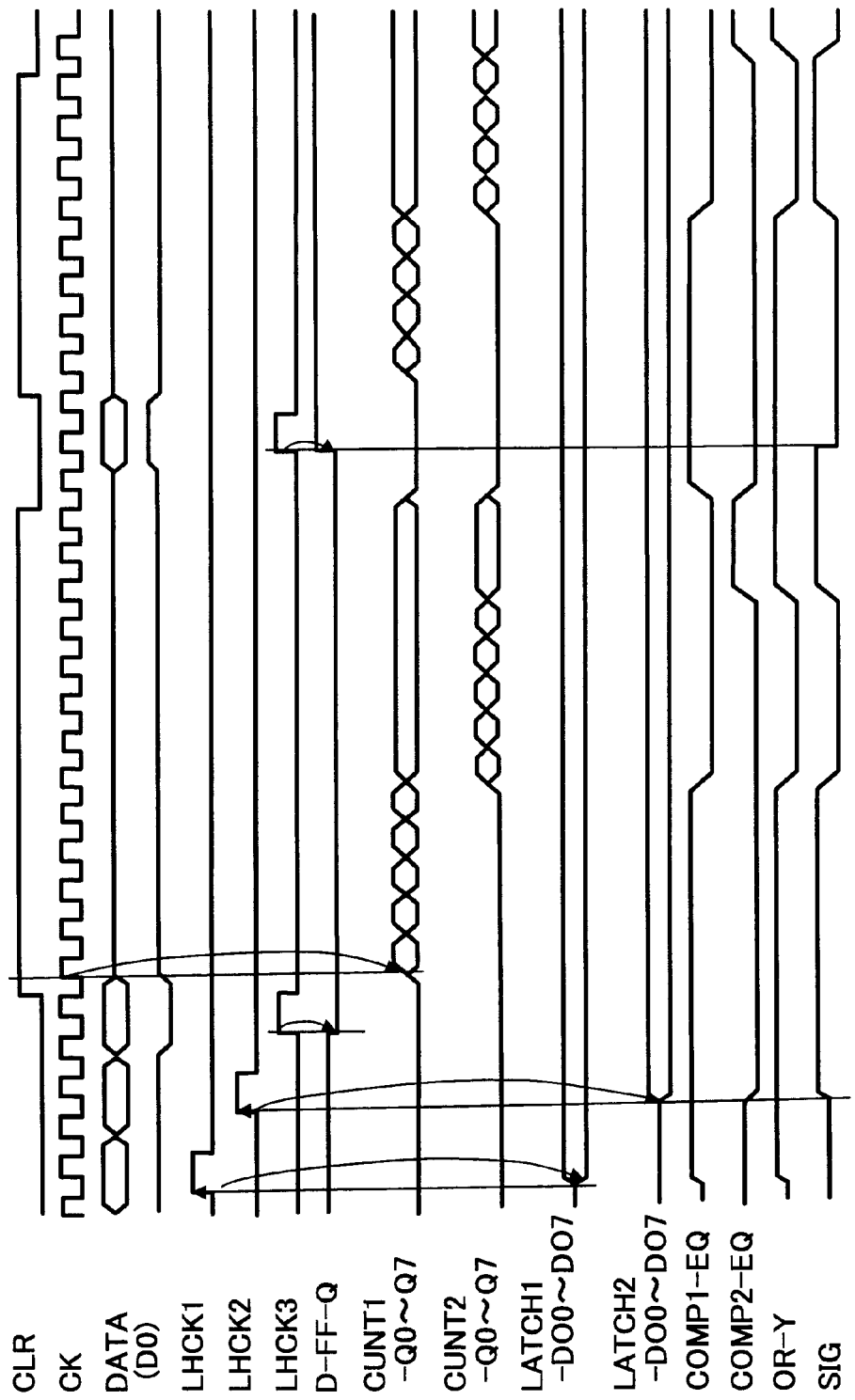
FIG. 9 is a timing chart illustrating an operation in the third generating section of an embodiment according to the present invention.

FIG. 3 is a circuit block diagram illustrating an embodiment of a third generating section 6 employed in the present invention. The circuit of FIG. 3 functions to generate a timing signal only during a specified time period which is set from a position of a trigger signal at a time of a main scanning. FIG. 9 is a timing chart illustrating an operation in the circuit of the third generating section 6. A D-type flip flop (D-FF) 6a maintains a signal input to its D input terminal with the clock (CK) and the output Q of the D-type flip flop 6a is output through an exclusive OR gate (EXOR) 6i as an external output SIG. A latch (LATCH 1) 6d maintains setting values respectively showing a starting position and ending position. The respective standard positions start at the positions where the clear (CLR) signal input to a counter (CNT1) 6b become logical "H". The standard clock (CK) is input to the counter (CNT1) 6b and the comparator (COMP1) 6c. At first, when the input CLR of the counter 6b is in the state of logical "L", the count value of the counter 6b is "00H".

The coincidence output EQ of the comparator (COMP1) 6c becomes logical "H" at the leading edge of the next clock (CK) and the count value of another counter (CNT2) 6e becomes "00H". And then, the EQ output of another comparator (COMP2) 6f becomes logical "L" at the leading edge of the next clock (CK).

In such a state as mentioned above, although both of the counter (CNT1) 6b and the other counter (CNT2) 6e are put in the countable state, since the respective CLR inputs are put in the state of logical "H", the count value thereof is kept to the value "00H", and the output of the OR gate (OR) 6h is put in the state logical "H". Next, when the CLR of the counter (CNT1) 6b becomes logical "L", the counter (CNT1) 6b starts counting at the leading edge of the clock (CK), the EQ of the comparator (COMP1) 6c becomes logical "L" at the leading edge of the clock (CK) immediately after the clock when the count value of the counter (CNT1) 6b becomes equal to the holding value of a latch (LATCH1) 6d, and the counter (CNT1) 6b stops its counting operation. Furthermore, since the CL input of the counter (CNT2) 6e becomes logical "L" at the same time, the counter (CNT2) 6e starts the counting operation at the leading edge of the clock (CK). At this time, both of the inputs A and B of the OR gate (OR) 6h are put in the state of logical "L", and the state of the output Y thereof is logical "L".

Next, the coincidence output EQ of the comparator (COMP2) 6f becomes logical "H" at the leading edge of the clock (CK) immediately after the clock at the time when the counting of the counter (CNT2) 6e advances and the count value thereof becomes equal to the value kept by the latch (LATCH2) 6g, and the counter (CNT2) 6e stops its counting operation. At this time, the output of the OR gate (OR) 6h becomes logical "H".

That is, the signal is put in the state of logical "L" during the time period from the setting value to the latch (LATCH1) 6d until the setting value to the latch (LATCH2) 6g is generated from the output terminal of the OR gate (OR) 6h. In such a circuit structure, the exchanging operation from inversion to non-inversion and vice versa can be performed by an exclusive OR gate (EXOR) 6i, as mentioned above.

Figure 4A:
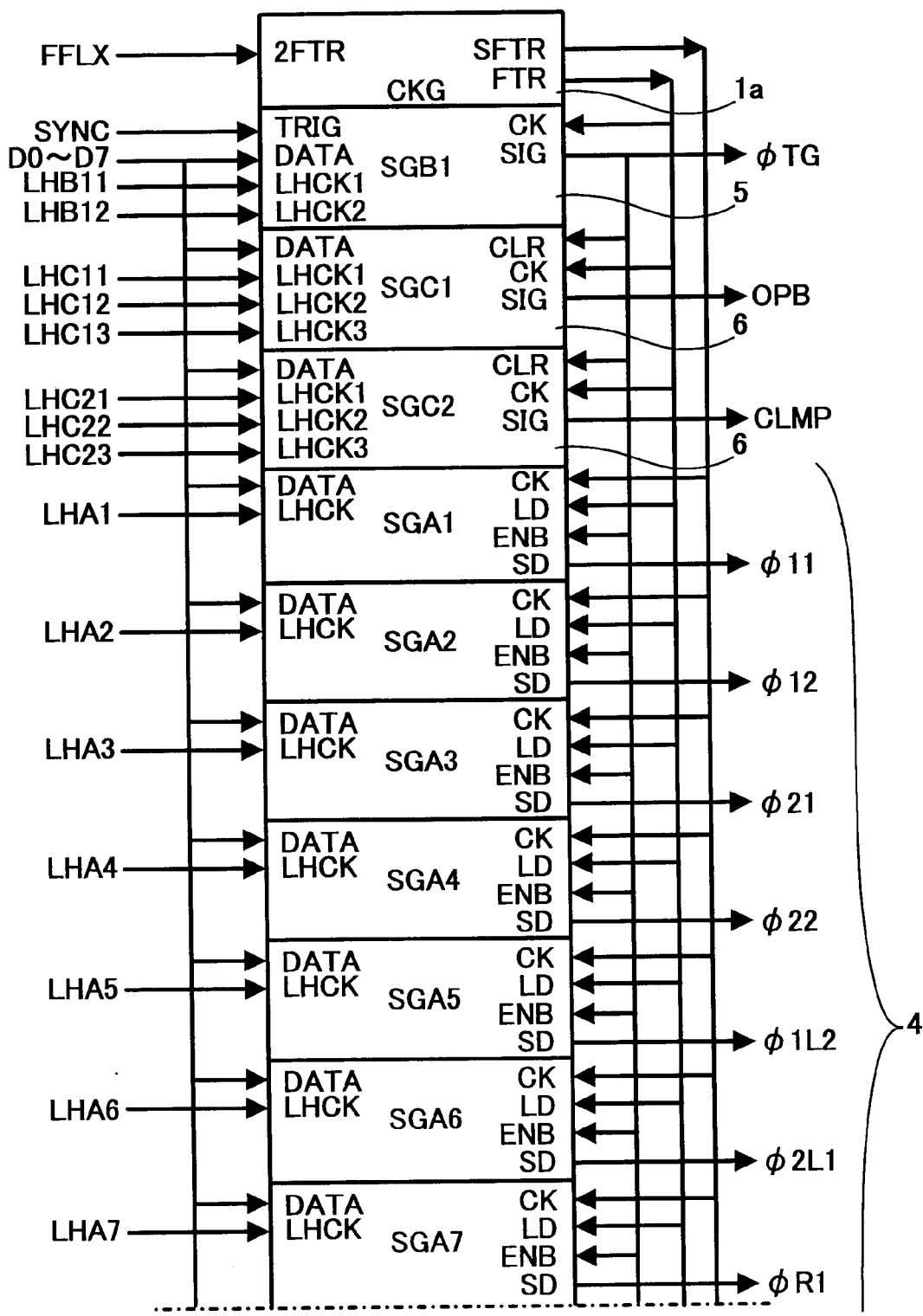
FIG. 4 is a circuit block diagram illustrating a timing generating section in an image forming apparatus of one embodiment according to the present invention.
Figure 4B:
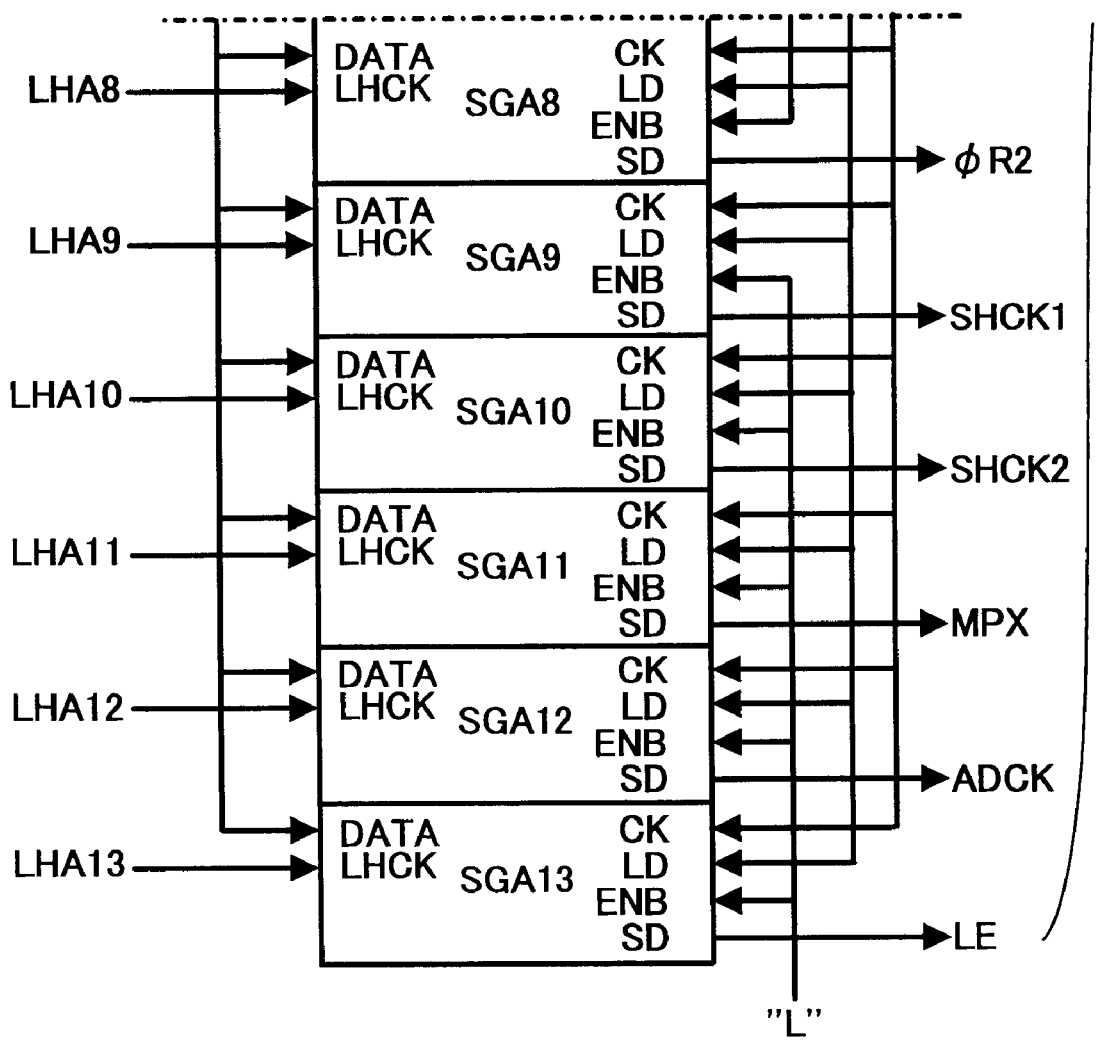
Figure 12:
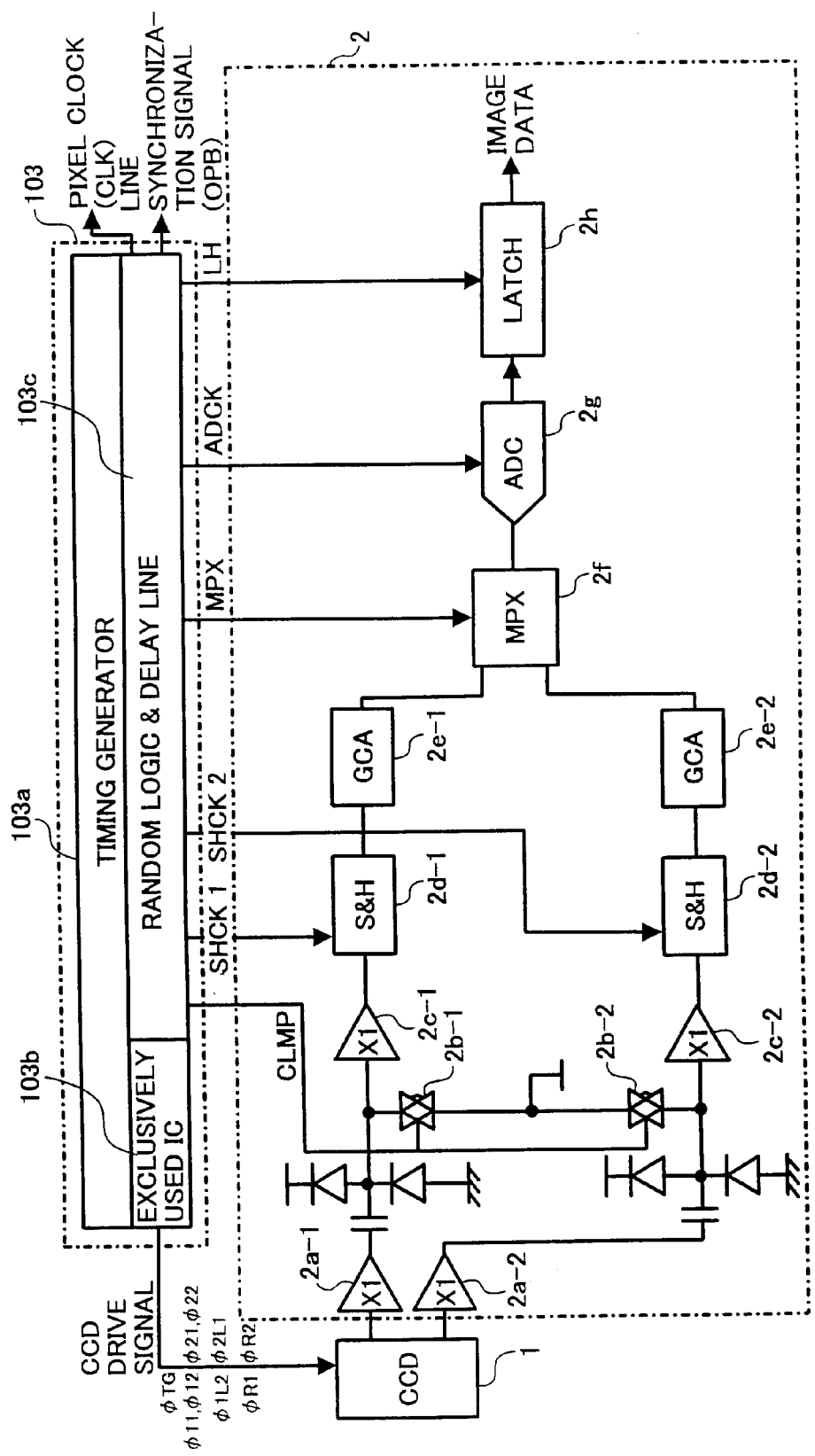
FIG. 12 is a circuit block diagram illustrating an example of a background image forming apparatus.
Figure 13:
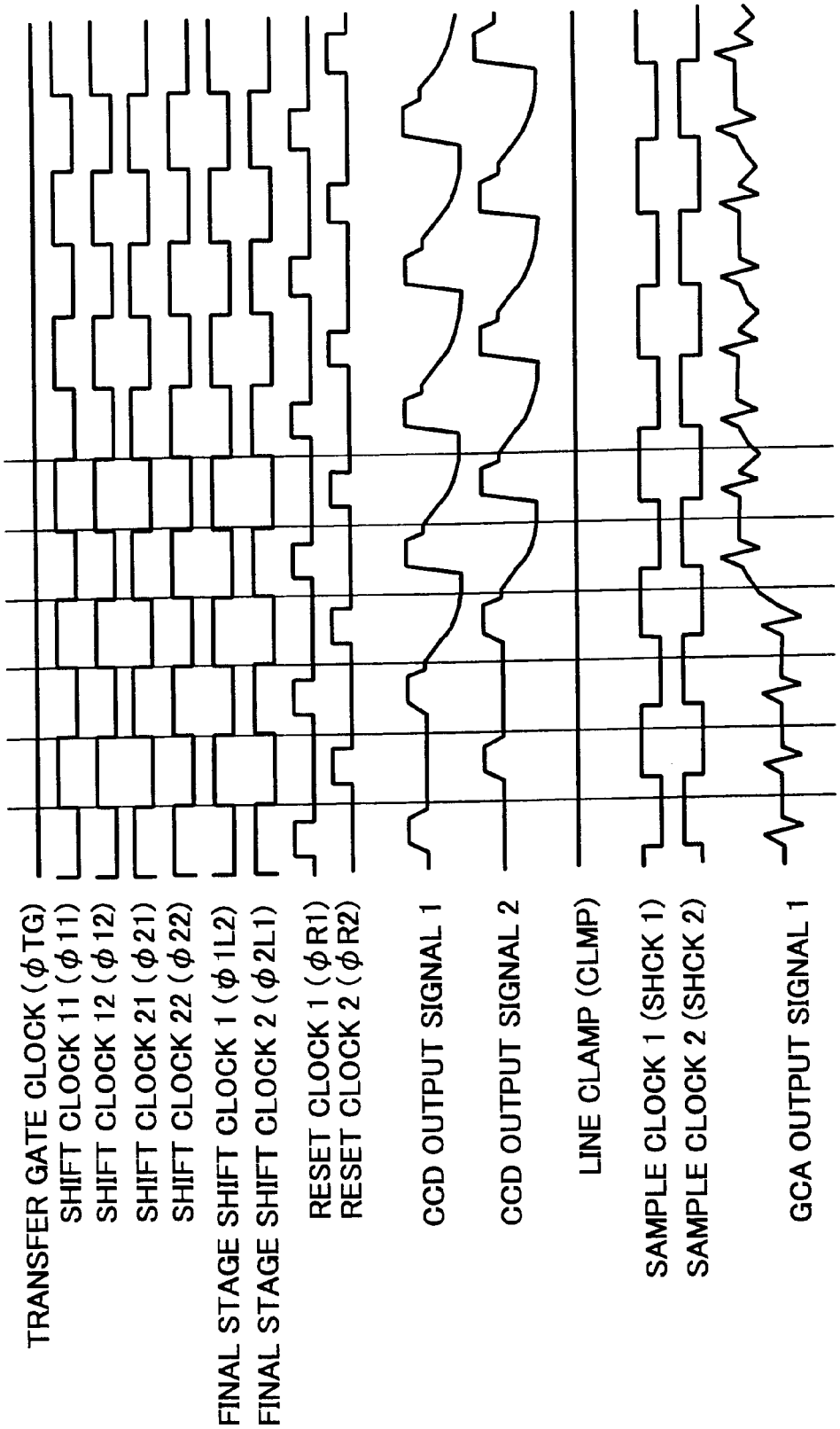
FIG. 13 is a timing chart for illustrating an operation of the background image forming apparatus of FIG. 12.

FIG. 4 is a circuit block diagram illustrating a timing generating section in an image forming apparatus of an embodiment according to the present invention. Namely, FIG. 4 shows an example of a timing generating section which is constructed with the aforementioned generating sections relating to the present invention as illustrated in FIG. 1, FIG. 2 and FIG. 3 in the timing generating section 103 of the background image forming apparatus as shown in FIG. 12.

In FIG. 4, a section (CKG) 1a is a clock generator for generating a frequency-multiplied (e.g., four times) output and a frequency-divided output which is constructed with a PLL frequency-multiplied circuit. The reference numerals SGA1–SGA13 represent the first generating sections corresponding to the first section 4 shown in FIG. 1 (the enable terminal is ENB instead of EN, and the polarity thereof is inverted in the respective sections). The symbol SGB1 represents the second generating section corresponding to the second generating section 5 shown in FIG. 2. The symbols SGC1 and SGC2 represent the third generating section corresponding to the third generating section 6 shown in FIG. 3.

In the timing generating section as shown in the examples, the input signal FPIX applied to the clock generator (CKG) 1a is a picture element (pixel) frequency, the input signal SYNC applied to the second generating section 5 is a main scanning synchronization signal, the input data D0–D7 applied to the respective sections are setting bus data for repeatedly generating the pattern, LHA1–LHA13 are latch clocks (LHCK) respectively corresponding to SGA1–SGA13, LHB11 and LHB 12 are latch clocks (LHCK1, LHCK2) applied to the second generating section 5, LHC11–LHC13 are latch clocks (LHCK1–LHCK3) of SGC1 in the third generating section 6, LHC21–LHC23 are latch clocks (LHCK1–LHCK3) of SGC2 in the third generating section 6.

Furthermore, the output signal FTR of the clock generator (CKG) 1a is a transfer clock frequency (signal) of the CCD, the signals 2FTR and 8FTR are respectively CCD transfer clocks of two-times and eight-times multiplied frequencies. The output signal φTG of the second generating section 5 is a transfer gate clock of the CCD. The output signal OPB of SGC1 in the third generating section 6 is a signal showing optical black of the CCD. The output signal CLMP of SGC2 in the third generating section 6 is an offset clamp signal of the processing circuit. Furthermore, the signals φ11 and φ12 are transfer clocks 1 and 2 at the channel 1 side of the CCD, and the signals φ21 and φ22 are transfer clocks 1 and 2 at the channel 2 side of the CCD. The signals φ1L1 and φ2L2 are respectively final stage transfer clocks at the channel 1 and 2 sides of the CCD. The signals φR1 and φR2 are respectively reset gate clocks at channel 1 and 2 sides of the CCD. The signals SHCK1 and SHCK2 are respectively sample and hold clocks at the channel 1 and 2 sides of the processing circuit. The signal MPX is a changing-over clock of an analog multiplexer. The signal ADCK is a conversion clock of an AD converter. The LH output signal is latch clock of the output latch.

Although the setting operation of all setting values excluding the changing-over of the polarity is performed with 8-bits in this embodiment, it is possible to use a construction in which the number of bits being set is increased or decreased as occasion demands. Furthermore, the clock signal of same frequency is employed in the same sort of generating circuit determines the fineness of the generated pattern, and it is possible to raise the clock frequency in relation to the pattern of the signal required to utilize a more precise timing by the use of different frequencies.

Figure 5:
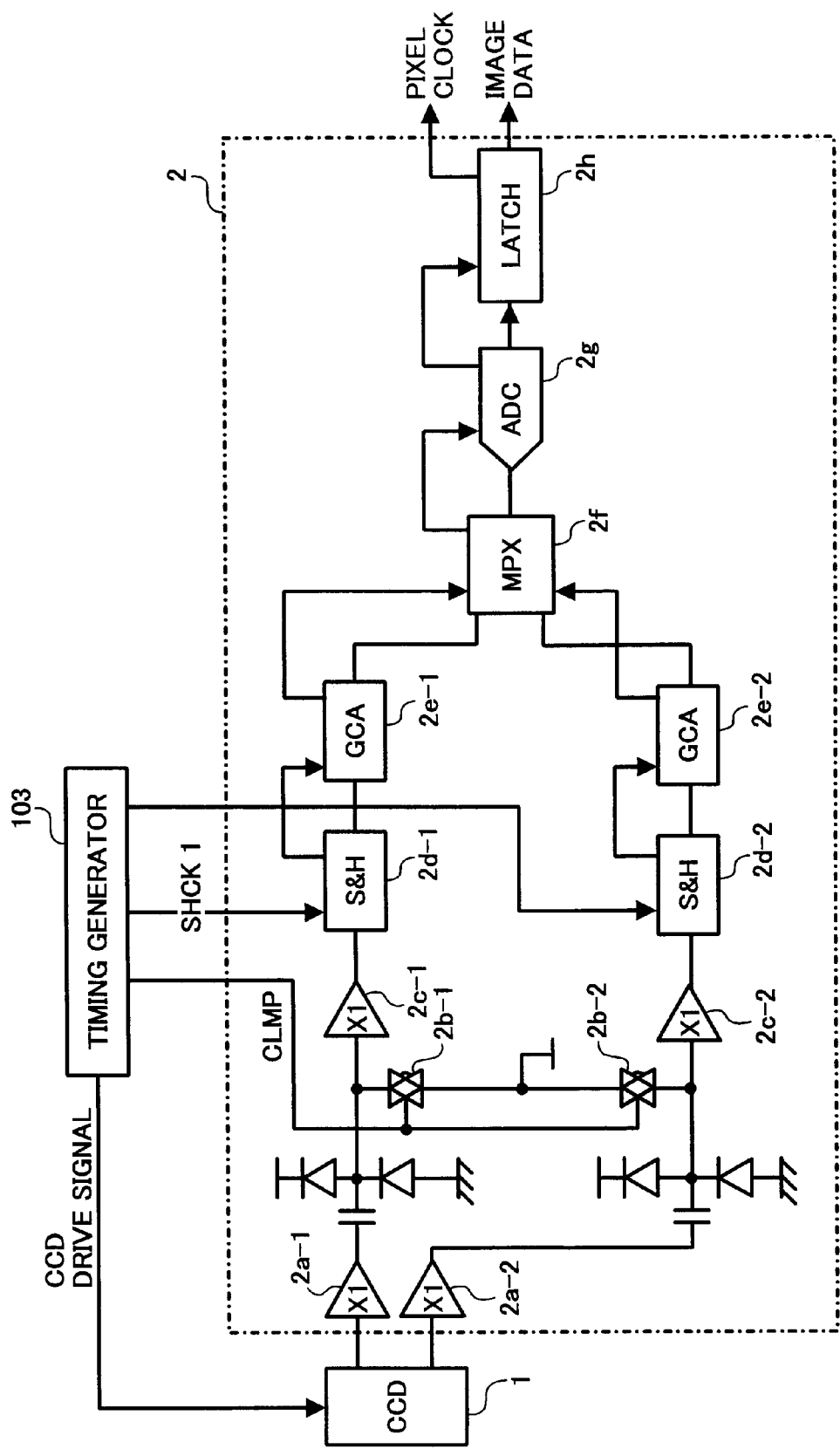
FIG. 5 is a circuit block diagram illustrating respective processing elements in a signal processing section in an image forming apparatus of another embodiment according to the present invention.

FIG. 5 is a circuit block diagram illustrating respective processing elements in a signal processing section in an image forming apparatus of another embodiment (a modification of the prior embodiment) according to the present invention.

In this embodiment, regarding the signals supplied to the processing elements in the signal processing section 2 from the timing generating section 103, the timing generating section 103 supplies only an offset clamp (CLMP) gate signal and sample clocks (SHCK1, SHCK2) to be applied to sample and hold (S & H) circuits 2d-1 and 2d-2 to the signal processing section 2. The sample and hold circuits perform a sample and holding operation, and in addition delay the input sample clock by a time period corresponding to the delay amount of the analog signal, and supply the sample clock thus delayed to the next-stage automatic gain control (GCA) circuits 2e-1 and 2e-2.

In the automatic gain control circuits 2e-1 and 2e-2, although the timing signal is not required in particular, the sample clock is delayed by the time period corresponding to the delay amount of the analog signal as in the case of the sample and hold circuits 2d-1, 2d-2. Furthermore, the sample clock thus delayed is supplied to a multiplex (MPX) circuit 2f of a next stage. In the multiplex (MPX) circuit 2f, the timing signal (sample clock) delayed in the same way is supplied to an AD conversion circuit 2g. In the AD conversion circuit 2g, the signal delayed by the time period corresponding to the delay amount is supplied to a latch (LATCH) 2h after analog to digital conversion. The latch 2h supplies an image clock delayed by the time period corresponding to the delay amount of itself to the processing system of the subsequent stage together with the image data as in the case of the aforementioned processing element.

As is apparent from the comparison between the embodiment shown in FIG. 5 and the example of the background image forming apparatus shown in FIG. 12, in the construction of this embodiment shown in FIG. 5 according to the present invention, the timing signal supplied to the signal processing section 2 from the timing generating section 103 as mentioned above is only CLMP and SHCK1, SHCK2. In the same construction, the other signals MPX, ADCK and LH are automatically created in the signal processing section 2. Consequently, since it is not necessary to perform complicated processings as in the case of the background timing generating section, the apparatus of the present invention does not need to provide any exclusively used IC, and thereby the construction of the apparatus of the present invention may be simplified.

Figure 6A:
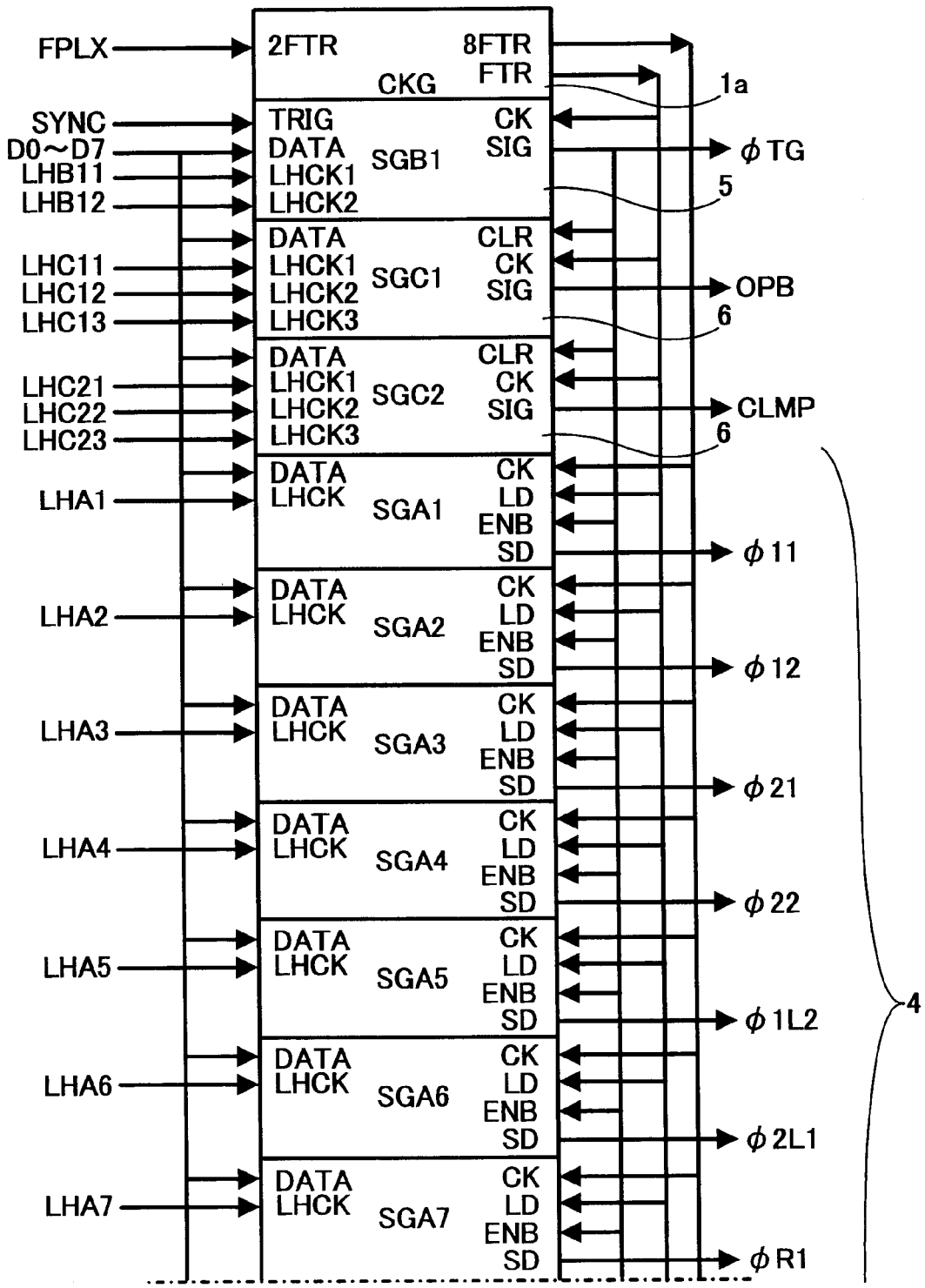
FIG. 6 is a circuit block diagram illustrating a timing generating section in an image forming apparatus of another embodiment according to the present invention.
Figure 6B:
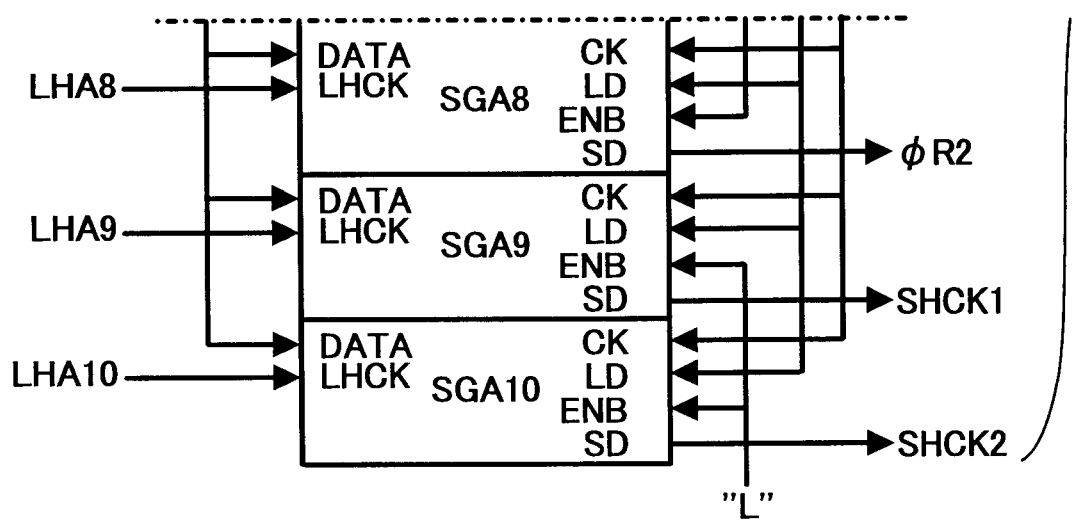

FIG. 6 is a circuit block diagram illustrating a timing generating section 103 in an image forming apparatus of still another embodiment according to the present invention. In this embodiment, a part of the timing generating section 103 as mentioned above in FIG. 5 is modified by adopting the blocks shown in FIG. 1, FIG. 2 and FIG. 3. The construction and the operation thereof are the same as described in relation to FIG. 4. In FIG. 6, a clock generator (CKG) is a clock generating element capable of generating a frequency-multiplied (e.g., four-times frequency) output and a frequency-divided output, which can be constructed with a PLL frequency-multiplying circuit. The symbols SGA1–SGA13 represent a section corresponding to the first generating section 4 shown in FIG. 1. However, EN is replaced by ENB and the polarity thereof is inverted in the interior of these sections. The symbol SGB1 represents a section corresponding to the second generating section 5 shown in FIG. 2. The symbols SGC1 and SGC2 represent sections corresponding to the third generating section 6 shown in FIG. 3. The different point between FIG. 4 and FIGS. 1–3 is that the sections SGA 11–SGA13 are added in FIG. 4.

The input signal FPIX applied to the clock generator (CKG) 1a is a pixel frequency. The input signal SYNC to the second generating section 5 is a main scanning synchronization signal. The input data D0–D7 to the respective sections are bus data previously set in order to repeatedly generate the pattern. LHA1–LHA10 are respectively latch clocks (LHCK) corresponding to SGA1–SGA10. LHB11 and LHB12 are latch clocks (LHCK1, LHCK2) to the second generating section 5. LHC11–LHC13 are latch clocks LHCK1–LHCK3 to SGC1 of the third generating section 6. LHC21–LHC23 are latch clocks (LHCK1–LHCK3) to SGC2 of the third generating auction 6.

Furthermore, the output signal FTR of the clock generator (CKG) 1a is a CCD transfer clock frequency. 2FTR or 8FTR are respectively 2-times or 8-times CCD transfer clock frequencies. The output signal φTG of the second generating section 5 is a CCD transfer gate clock. The output signal OPB of the SGC1 in the third generating section 6 is a CCD optical black showing signal. The output signal CLMP of SGC2 in the third generating section 6 is an offset clamp signal of the processing circuit.

Furthermore, φ11 and φ12 are transfer clocks 1 and 2 at the side of a channel 1 of the CCD. φ21 and φ22 are transfer clocks 1 and 2 at the side of a channel 2 of the CCD. φ1L1 and φ2L2 are respectively final stage transfer clocks at the respective sides of the channels 1 and 2 of the CCD. φR1 and φR2 are respectively reset gate clocks at the side of CCD channels 1 and 2. SHCK1 and SHCK2 are sample clocks at the side of the channels 1 and 2. SHCK1 and SHCK2 are sample clocks at the side of the channels 1 and 2 of the respective processing elements.

In this embodiment, although value setting operations excluding the changing-over of polarity are performed by the use of 8-bits as in the case of FIG. 4, it is possible to adopt a structure in which the number of setting bits is increased or decreased as occasion demands. Furthermore, the clock of same frequency generated by the same sort of generating circuit can be used in order to determine the fineness of the generated pattern, but it is also possible to make fine only the pattern of the signal which is strict for the timing by use of different frequencies.

FIG. 10 is flow chart illustrating another embodiment of the present invention. In FIG. 10, an example of the flow chart in the embodiment further adds a function of automatically adjusting the timing to the embodiment as shown in FIG. 4.

Figure 10B:
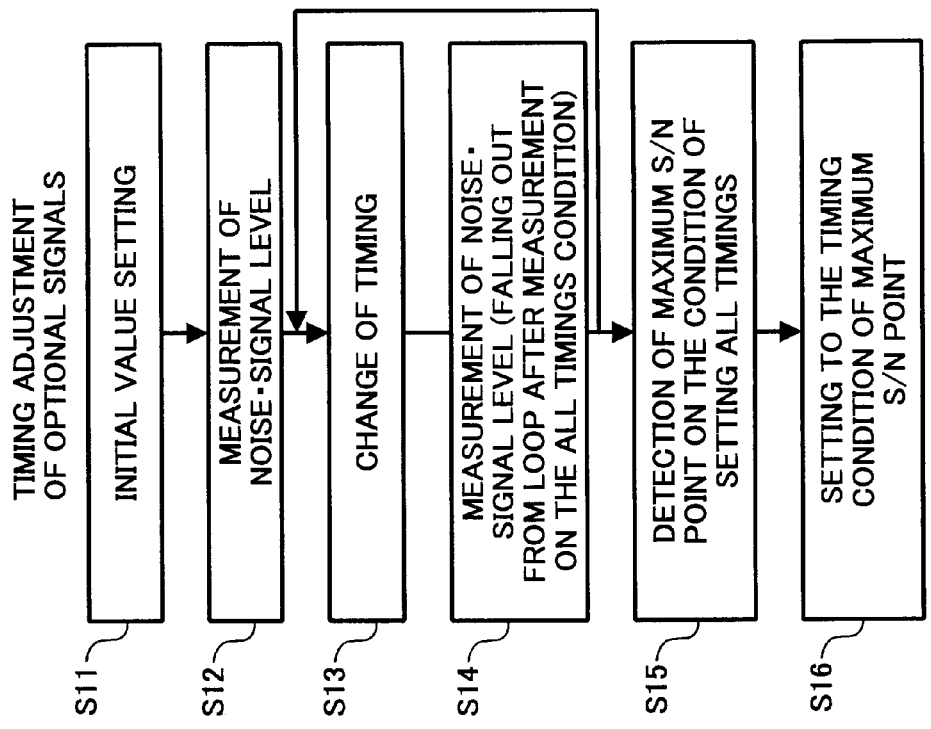
FIG. 10 is a flow chart illustrating another embodiment of the present invention, wherein FIG. 10(a) and FIG. 10(b) respectively show an overall adjustment flow and a timing adjustment for an optional signal.
Figure 10A:
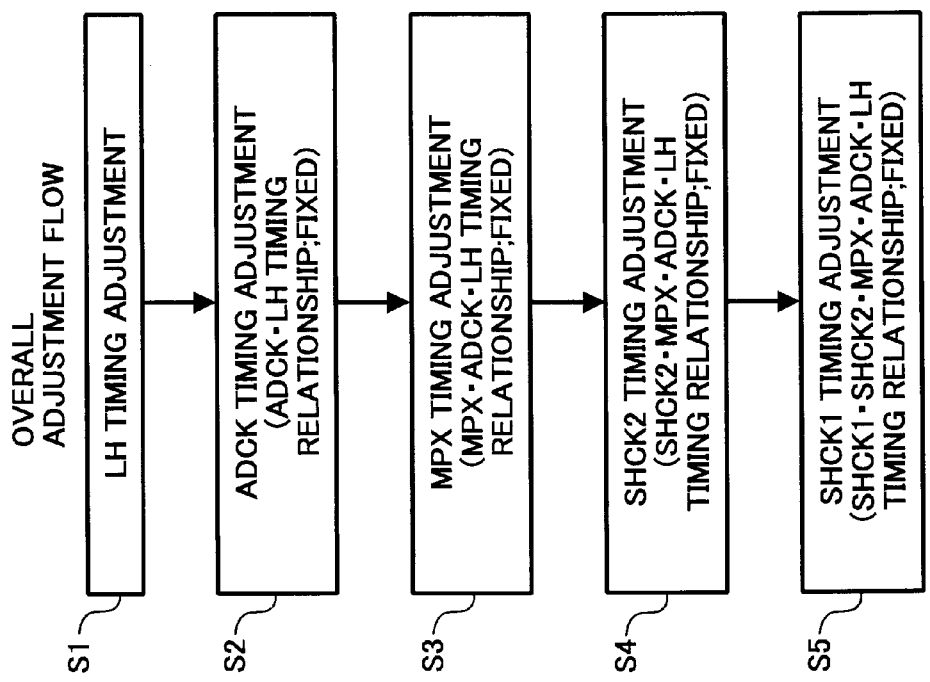
Figure 11A:
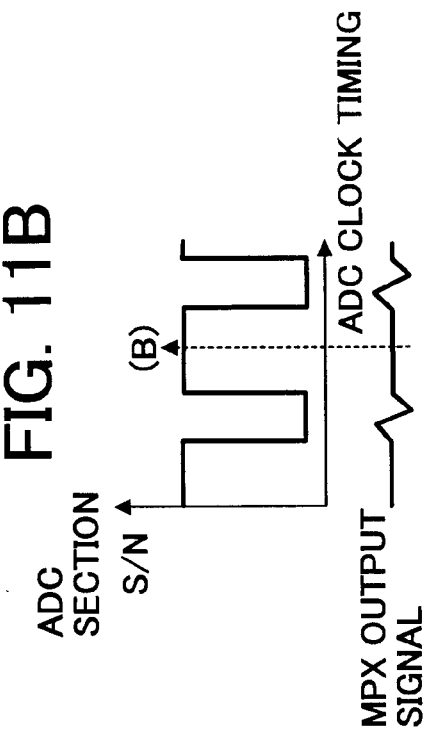
FIG. 11 is a timing chart for illustrating an operation of another embodiment according to the present invention, wherein FIGS. 11(a) through 11(d) respectively illustrate operations of another embodiment relating to a latch clock timing, an ADC clock timing, and a MPX clock timing.
Figure 11C:
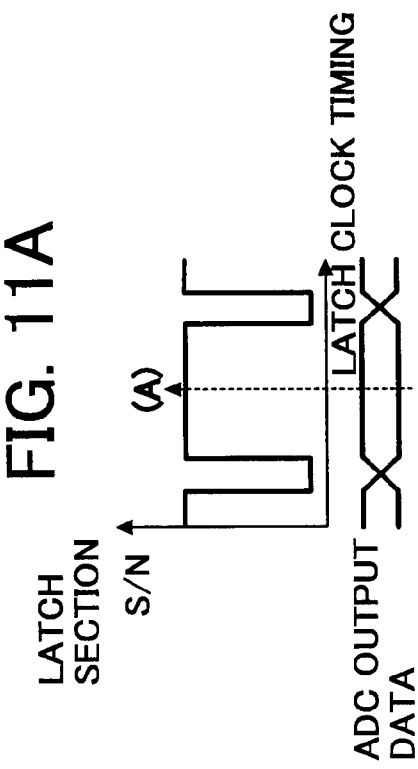
Figure 11B:
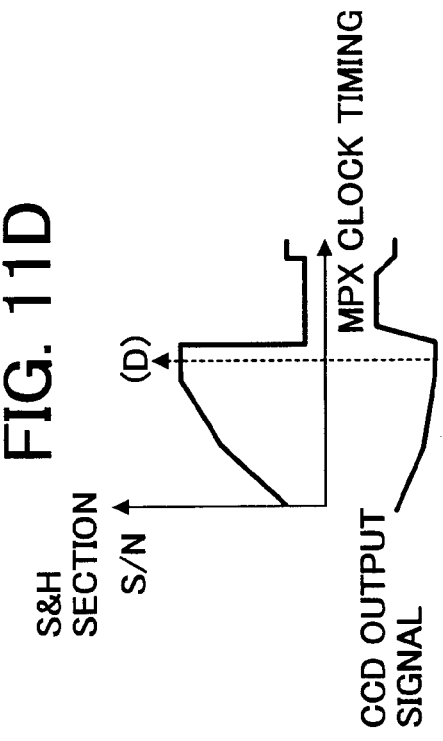
Figure 11D:
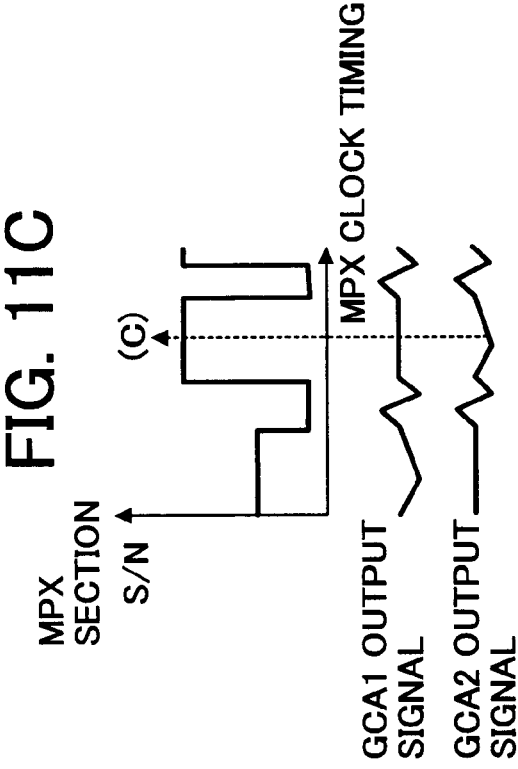

To state more concretely, as is apparent from referring to the respective processing elements as shown in FIG. 12 as the adjustment flow of an overall timing, the adjustment is performed from a rear stage for the signal flow in FIG. 10a. Furthermore, the timing thus adjusted from the rear stage does not exert any influence upon the further rear (subsequent) stages. The actual flow is concretely described hereinafter.

At first, the timing of the latch clock (LH) gate signal of the latch (LATCH) circuit 2h is adjusted (see step S1). Next, the timing of the AD converter gate (ADCK) signal of the AD conversion circuit 2g is adjusted (see step S2). By performing such an adjustment, the timings of the LH signal and the ADCK signal are fixed together. In the same way, the timing of the multiplex (MPX) gate signal of the multiplex (MPX) circuit 2f is adjusted, and thereby the timings of the MPX signal, ADCK signal and LH signal are fixed (see step S3). Furthermore, the timing of the reset gate clock (SHCK2) signal of the sample and hold (S & H) circuit 2d-2 is adjusted, and thereby the timings of SHCK2 signal, MPX signal, ADCK signal and LH signal are fixed (see step S4). Furthermore, and finally, the timing of the reset gate clock (SHCK1) of the sample and hold (S & H) circuit 2d-1 is adjusted, and thereby the timings of the SHCK1 signal, SHCK2 signal, MPX signal, ADCK signal and LH signal are fixed (see step S5).

Furthermore, when the timing adjustment is performed for the respective circuits, S/N is measured in the all timing conditions and the condition is set to the timing condition of maximum S/N as shown in the case of the timing adjustment of the optional signal shown in FIG. 10b. In FIG. 10b, at the time of setting the initial value firstly, the CCD reads plural lines of the output image data corresponding to the effective picture element (pixel) in a state that reflection light reflected from a standard white plate is directed to the CCD as incident light, and a pixel line having a largest average value is established as the S/N measurement pixel line (see step S11).

Furthermore, regarding the signal of the timing to be adjusted, the optional timing is established, the above-mentioned S/N measurement pixel line is read plural times, and assuming that the average value of the read values is treated as the signal level S and the unevenness thereof is treated as the noise level N, the value of S/N is measured (see step S12). The timing is then changed in various ways (see step S13), the value of S/N is measured, and the data pattern is changed and the value of S/N is again measured (see step S14). Furthermore, the maximum value among the measured value of S/N is detected (see step S15). The timing condition is then established so as to obtain the maximum value (see step S16).

FIGS. 11(a) through 11(d) illustrate states of changing timing and measuring the value of S/N per each of the respective processing elements (LATCH section, ADC section, MPX section and S & H section).

Here, it can be understood that the positions which are stable even though the value of S/N is a maximum and the timing is shifted a little are, respectively, "A", "B", "C", and "D" per each of the respective processing elements. In such a way, if the timing is established from the maximum value of S/N, there is no fear that an error operation of seemingly establishing a timing for reducing noise as an optimum condition occurs as a result of lowering sensitivity.

Furthermore, in the examples as shown in FIG. 11, although the timing for the CCD driving signal is not adjusted, it may be allowed that the timing adjustment of the CCD driving signal is jointly performed if occasion demands. Furthermore, although the timing for performing such an automatic adjustment is a time when the power source is turned on or a time when the ambient temperature is largely changed, it may be effective to manually start up the operation of the automatic adjustment as occasion demands.

In this way, in the present invention the timing generating section is constructed without any exclusively used IC as mentioned above, and therefore the CCD can be replaced easily, and thereby it may be effective to provide an image forming apparatus capable of realizing reduced cost for manufacturing.

As is apparent from the foregoing description, as a further feature of the present invention, the present invention is constructed such that timing is delayed and output corresponding to the delay time between an input image signal and an output image signal per each respective processing elements of the aforementioned signal processing section, and the timing signal is sequentially supplied to a respective processing element of the image signal also processed sequentially. Thereby, the present invention is effective in providing an image forming apparatus capable of largely reducing a burden of controlling timing required for a timing generating section, and which is capable of enabling high-speed image data processing with low cost.

As is apparent from the foregoing description, in a further feature of this invention, the timing is delayed and output corresponding to the delay time between the input image signal and the output image signal per each of the respective processing elements of the aforementioned signal processing section. The timing signal is sequentially supplied to respective processing elements for sequentially processing the image signal, and further, the timing signal is supplied to the first stage of the processing element. Consequently, a burden of controlling the timing required for the timing generating section is largely reduced and a CCD can be easily replaced. Thus, the present invention is effective in providing an image forming apparatus capable of performing high-speed image data processing.

As is apparent from the foregoing description, as a further feature in the present invention, since the timing generating section is constructed such that the timing required for the optoelectric conversion element and the signal processing section can be adjusted automatically, various processings can be performed with optimum timing regardless of a time-elapsing variation and ambient temperature variation, etc. Furthermore, such an image forming apparatus in the present invention is capable of always stably performing high-speed image data processing.

The embodiments or modifications thereof described heretofore are only examples. However, the other embodiments or modifications base on the same technical thoughts can be applied to the present invention, needless to mention.

Obviously, numerous additional modifications and variations of the present invention are possible in light of the above teachings. It is therefore to be understood that within the scope of the appended claims, the present invention may be practiced otherwise than as specifically described herein.

The present application is based on Japanese priority document 0-120,234, the contents of which are incorporated herein by reference.

What is claimed is:

1. An image forming apparatus comprising:
   an optoelectric conversion element for converting an image read from a document to an electric signal;
   signal processing means for converting the electric signal from said optoelectric conversion element to digital image data; and
   timing generating means for generating a timing signal to be applied to said optoelectric conversion element and said signal processing means,
   wherein said timing generating means includes:
      first pattern signal generating means for repeatedly generating a previously established pattern signal;
      second pattern signal generating means for repeatedly generating the previously established pattern signal and stopping the generation of the previously established pattern signal only during a predetermined time period of one scanning to generate a signal in an active state during a time period set from an external trigger signal; and
      third pattern signal generating means for generating a timing signal starting at generation of a trigger signal in a main scanning.

2. The image forming apparatus as defined in claim 1, wherein the timing signal supplied per each of respective processing elements of said signal processing means is supplied to a first stage of the respective processing elements connected sequentially in accordance with an image processing procedure, and the timing signal adjusts a delay amount therein.

3. An image forming apparatus an defined in claim 1, wherein said timing generating means automatically adjusts a delay amount of the timing signal needed in said optoelectric conversion element and said signal processing means.

4. An image forming apparatus, comprising:
   an optoelectric conversion element for converting an image read from a document to an input electric signal;
   signal processing means for converting the input electric signal from said optoelectric conversion element to digital image data; and
   timing generating means for generating a timing signal to be applied to said optoelectric conversion element and said signal processing means,
   wherein the timing signal has a delay amount adjusted in accordance with a delay time between the input electric signal and the output digital image data per each of respective processing elements of said signal processing means sequentially supplied in an order of the respective processing elements.

5. An image forming apparatus comprising:
   a CCD element converting an image read from a document to an electric signal;
   a signal processor converting the electric signal from said CCD element to digital image data; and
   a timing generator generating a timing signal to be applied to said CCD element and said signal processor,
   wherein said timing generator includes:
      a first pattern signal generator repeatedly generating a previously established pattern signal;
      a second pattern signal generator repeatedly generating the previously established pattern signal and stopping the generation of the previously established pattern signal only during a predetermined time period of one scanning to generate a signal in an active state during a time period set from an external trigger signal; and
      a third pattern signal generator generating a timing signal starting at generation of a trigger signal in a main scanning.

6. The image forming apparatus as defined in claim 5, wherein the timing signal supplied per each of respective processing elements of said signal processor is supplied to a first stage of the respective processing elements connected sequentially in accordance with an image processing procedure, and the timing signal adjusts a delay amount therein.

7. An image forming apparatus an defined in claim 5, wherein said timing generator automatically adjusts a delay amount of the timing signal needed in said CCD element and said signal processor.

8. An image forming apparatus, comprising:
   a CCD element converting an image read from a document to an input electric signal;
   a signal processor converting the input electric signal from said CCD element to digital image data; and
   a timing generator generating a timing signal to be applied to said CCD element and said signal processor,
   wherein the timing signal has a delay amount adjusted in accordance with a delay time between the input electric signal and the output digital image data per each of respective processing elements of said signal processor sequentially supplied in an order of the respective processing elements.

9. A method of forming an image in an image forming apparatus, comprising steps of:
   converting an image read out from a document to an electric signal;
   converting the electric signal to digital image data; and
   generating a timing signal to be applied in said steps of converting the image read out from the document and converting the electric signal,
   wherein said step of generating said timing signal further include the substeps of:
      repeatedly generating a previously established pattern signal;
      repeatedly generating the previously established pattern signal and stopping the generation of the previously established pattern signal only during a predetermined time period of one scanning to generate a signal in an active state during a time period set from an external trigger signal; and
      generating a timing signal starting at generation of a trigger signal in a main scanning.

10. A method of forming an image in an image forming apparatus as defined in claim 9, wherein in the step of generating the timing signal the timing signal is supplied for each of respective processing elements connected sequentially in accordance with an image processing procedure, and the timing signal adjusts a delay amount therein.

11. A method of forming an image in an image forming apparatus as defined in claim 9, wherein in the step of generating the timing signal a delay amount of the timing signal is automatically adjusted.

12. A method of forming an image in an image forming apparatus comprising steps of:

converting an image read out from a document to an input electric signal by an optoelectric conversion operation;

converting the input electric signal to digital image data; and generating a timing signal to be applied in said steps of converting the image read out from the document and converting the electric signal, wherein the timing signal has a delay amount adjusted in accordance with a delay time between the input electric signal and the output digital image data per each of respective processing elements.

13. An image forming apparatus comprising:

a CCD element converting an image read from a document to an electric signal;

a signal processor converting the electric signal from said CCD element to digital image data; and a timing generator generating a timing signal to be applied to said CCD element and said signal processor, said timing generator not using an exclusively integrated circuit for the CCD element, wherein said timing generator includes:

a first pattern signal generator repeatedly generating a previously established pattern signal;

a second pattern signal generator repeatedly generating the previously established pattern signal and stopping the generation of the previously established pattern signal only during a predetermined time period of one scanning to generate a signal in an active state during a time period set from an external trigger signal; and a third pattern signal generator generating a timing signal starting at generation of a trigger signal in a main scanning.

* * * * *